United States Patent [19]
Mallick et al.

[11] Patent Number: 5,508,973
[45] Date of Patent: Apr. 16, 1996

[54] METHOD FOR DETERMINING THE PRINCIPAL AXES OF AZIMUTHAL ANISOTROPY FROM SEISMIC P-WAVE DATA

[75] Inventors: Subhashis Mallick, Missouri City; Ronald E. Chambers, Houston; Alfonso Gonzalez, Sugarland, all of Tex.

[73] Assignee: Western Atlas International, Inc., Houston, Tex.

[21] Appl. No.: 254,306

[22] Filed: Jun. 6, 1994

[51] Int. Cl.$^6$ .................................................. G01V 1/30
[52] U.S. Cl. ........................... 367/38; 367/56; 364/421
[58] Field of Search ............................... 367/38, 56, 57, 367/59; 364/421

[56] References Cited

U.S. PATENT DOCUMENTS

| | | | |
|---|---|---|---|
| 4,363,113 | 12/1982 | Taner et al. | 367/63 |
| 4,432,078 | 2/1984 | Silverman | 367/37 |
| 4,571,710 | 2/1986 | Neidell et al. | 367/38 |
| 4,646,239 | 2/1987 | Bodine et al. | 364/421 |
| 4,817,061 | 3/1994 | Alford et al. | 361/75 |
| 5,136,550 | 8/1992 | Chambers | 367/38 |
| 5,241,514 | 8/1993 | Ehlers | 367/61 |
| 5,253,217 | 10/1993 | Justice, Jr. et al. | 367/46 |
| 5,414,674 | 5/1995 | Lichman | 367/49 |

FOREIGN PATENT DOCUMENTS 0640847  3/1995  European Pat. Off. .

OTHER PUBLICATIONS

Mallick, S. and Frazer, L. N., Reflection/Transmission Coefficients and Azimuthal Anisotropy in Marine Seismic Studies, Geophysical Journal International, v. 105, pp. 241–252, 1991.
Wang, H., "Noise Elimination by the use of Vector Resolution", Geophysics, vol. 55, No. 9, Sep. 1990.
Mallick, S., "A Simple Approximation to the P-Wave Reflection Coefficient and its Implication in the Inversion of Amplitude Variation with Offset Data", Geophysics, vol. 58, No. 4, Apr. 1993.

Primary Examiner—Charles T. Jordan
Assistant Examiner—Christopher K. Montgomery
Attorney, Agent, or Firm—William A. Knox

[57] ABSTRACT

A method for measuring the principal axis of fracture-induced formation anisotropy. Amplitude vectors are measured from CMP gathers oriented along in-line and cross-line wavefield trajectories. The amplitude vectors are resolved with the known orientations of the seismic lines of survey to estimate the azimuth of the anisotropic axis.

18 Claims, 5 Drawing Sheets

METHOD FOR DETERMINING THE PRINCIPAL AXES OF AZIMUTHAL ANISOTROPY FROM SEISMIC P-WAVE DATA

BACKGROUND OF THE INVENTION

1. Field of the Invention

This is a method for estimating the principal axis of azimuthal anisotropy by use of compressional seismic wavefields. For many crusted materials, the azimuthal anisotropy is induced by vertical fractures, in which case the principal axes corresponds to the orientation of fractures.

2. Discussion of Related Art

Fracture detection is of great interest in seismic exploration. Because of improved technology in horizontal drilling, determination of vertical fracture orientation is important. If fracture orientation can be measured from seismic data, horizontal boreholes can be directed perpendicular to the fractures for maximum hydrocarbon recovery. Vertical fractures are formed in relatively brittle subsurface earth formations due to folding stresses. A typical example is the fractured Austin Chalk which underlies the Taylor shale formation.

It is well known that vertical fractures in an otherwise isotropic rock will induce angular or azimuthal anisotropy in the fractured medium. By definition, in an isotropic medium, the velocity of propagation of an acoustic wave is the same along all three spatial axes: x, y, and z. In an anisotropic medium, the acoustic velocity is greater along one axis, termed the principal axis, than it is along the other two axes. The velocity increase may be due to a change in the elastic constants of the rock such as that due to a change in cementation, particle size, composition, depth of burial, fluid content, structure and other factors. Commonly, the principal anisotropic axis is along the vertical or z axis. Lateral anisotropy along a substantially horizontal axis sometimes is observed on a broad regional basis but that change is gradual and of little concern on a local basis.

As stated earlier, vertical, oriented fractures in an otherwise isotropic medium induce significant local lateral anisotropy fields. The propagation velocity of a wavefield varies with the ray-path incident angle and the lateral angular direction of wavefield propagation relative to the strike of the fracture zone. The velocity of an acoustic wavefield is greatest along a direction parallel to strike and is least when the wavefield trajectory is perpendicular to the plane of the vertical fracture zone.

An explanation of the physical reasons for that effect may be found in U.S. Pat. No. 4,817,061 which issued Mar. 28, 1989 to R. M. Alford et al. which is incorporated herein by reference, but only for its tutorial content. In that patent, polarized shear wave surveys are performed to determine azimuthal variations in the earth's subsurface caused by fracture orientation and density. The surveys may be done by using the same polarization (either horizontal or vertical) for the shear waves along two different seismic lines of profile or by using two different polarizations along a single common line of profile. The survey data can then be processed and compared; any difference constitutes a measure of fracture orientation and density. That patent, however, teaches away from and specifically dismisses use of compressional or P waves for vertical fracture studies.

The method taught by the '061 patent has the serious disadvantage that multicomponent sources and receivers must be used in order to generate shear waves having the required polarization. That drawback is particularly disadvantageous in the case of the sources because two separate vibrators must be used, one to generate horizontally-polarized shear waves and one to generate vertically-polarized wavefields, each vibrator costing several megadollars.

U.S. Pat. No. 4,571,710, issued Feb. 8, 1986 to N. S. Neidel et al for a Seismic Method for Identifying Low Velocity Subsurface Zones, teaches a method which uses seismic data having different directions of propagation through a common subsurface anomaly to measure the interval velocity variation within a selected formation interval, using moveout-derived velocities as a function of direction. A velocity variation is taken to be qualitatively diagnostic of porosity.

The '710 patent is of limited use for qualitative measures of porosity but the method is not uniquely indicative of vertical fracturing.

In an effort to reduce the high cost of the sources needed for the '061 patent method, Mallick and Frazer suggested use of converted waves from P-wave data in a paper entitled Reflection/Transmission Coefficients and Azimuthal Anisotropy in Marine Seismic Studies, published in the Geophysical Journal International, v. 105, pp 241–252, 1991. Use of converted wave data does indeed provide a cheaper alternative to a multicomponent wavefield source. But the signal-to-noise ratio in converted waves data is usually very low which causes serious errors in predicting the fracture orientation. Moreover, the method requires dense 3-D multicomponent recording resulting in an extremely large volume of data that needs to be processed as well as new interpretation techniques that have not yet been fully developed by the seismic industry.

SUMMARY OF THE INVENTION

Herein is taught a method comprising the steps of emitting a compressional wave field into the earth from a source, for insonifying the subsurface earth layers to generate reflected wavefields after reflection of the wave field from the respective subsurface earth layers. The reflected wavefields are received by seismic sensors that are distributed along a first and a second line of survey, each line having a known orientation. The received reflected wavefields are recorded as first and second discrete time series that are then formatted as first and second CMP data-sample gathers. Within a selected time zone from the first and second CMP data-sample gathers, a first and second average amplitude vector is determined. The first and second average amplitude vectors are resolved with the known orientations of the lines of survey to estimate the azimuth of the principal axis of anisotropy.

In an additional aspect of this invention, seismic sensors are distributed along a third line of survey established that has an orientation that approximately bisects the orientations of the first and second lines of survey. Reflected wave fields detected by the seismic sensors along the third line of survey provide the data for defining a third amplitude vector which may be used to improve the accuracy of the resolution of the principal anisotropic axis.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
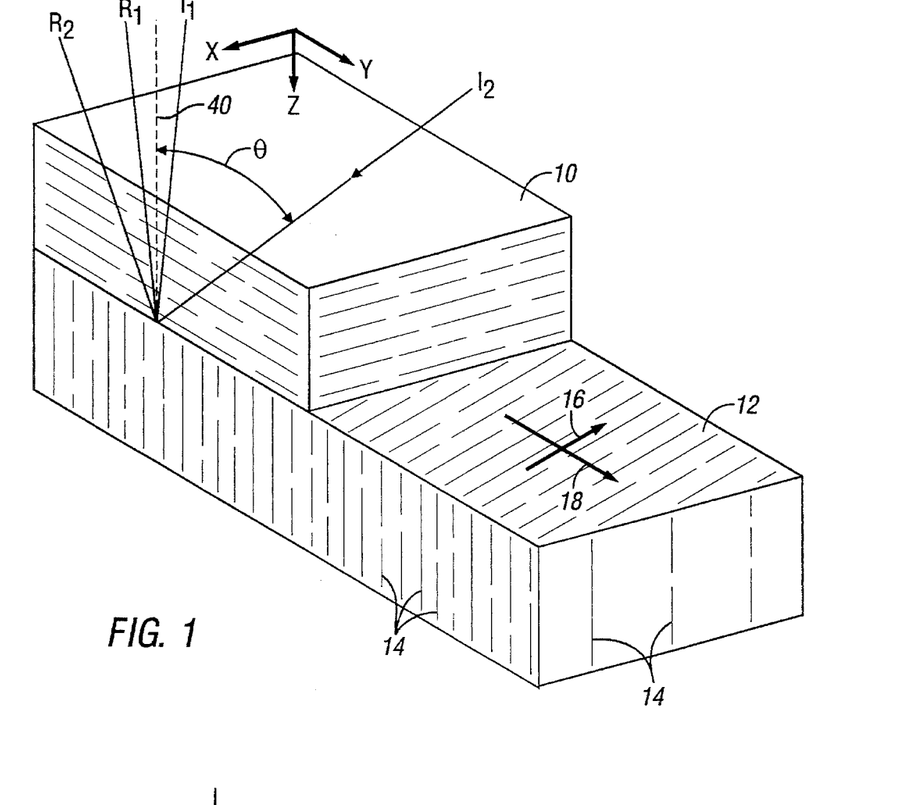
FIG. 1 is a quasi-perspective view of a vertically-fractured formation.

FIG. 1 is a quasi-perspective view of a first horizontally-bedded formation 10 that overlies formation 12 which is vertically fractured as represented by the vertical lines 14. The front portion of formation 10 has been swept away to uncover details of interest in formation 12. The strike azimuth of the fracture pattern is indicated by the arrow 16; the perpendicular to the strike direction is represented by arrow 18. Horizontal x and y coordinates are shown at the upper rear corner of block 10. The z direction is depth.

Figure 2:
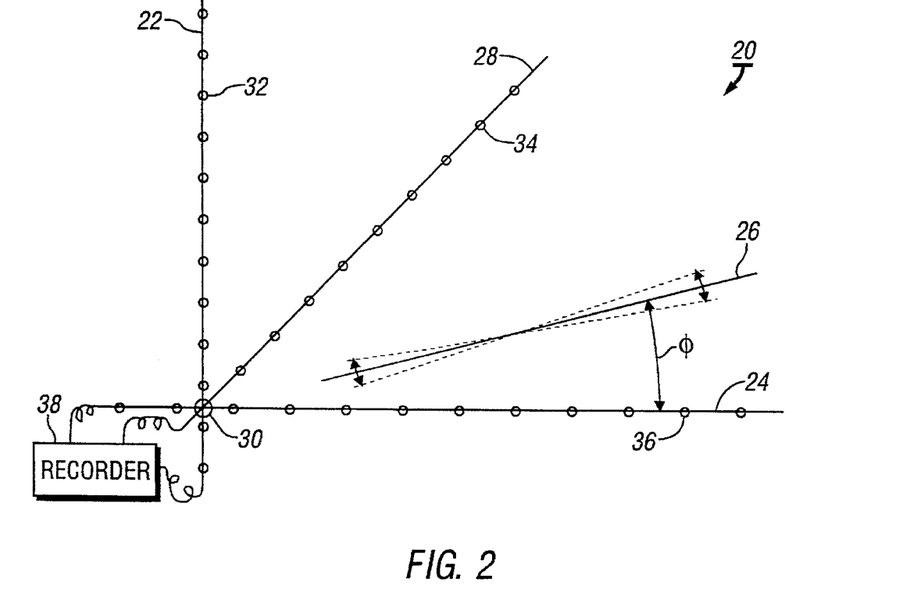
FIG. 2 is a plan view of a seismic source-receiver array with the receivers distributed along three lines of survey, one line of which is oriented at an angle φ with the average strike of a fracture pattern.

Referring now to FIGS. 1 and 2, an exemplary seismic array 20 of intersecting seismic lines of survey, is located on the surface of the earth (not shown in FIG. 1). By way of example but not by way of limitation, the seismic array 20 includes two orthogonally-oriented lines of survey 22 and 24. The azimuth of line 24 makes an angle φ with the average strike 26 of the fracture pattern. A third line of survey 28 has an azimuth that substantially bisects the azimuthal orientations of lines 22 and 24. The three lines include a common source 30 that is arranged to emit wavefields into the earth along wavefield-trajectories that are coincident with the lines of survey. The wave fields are reflected from subsurface earth layers such as horizontally layered formation 10 and fractured formation 12 as shown in FIG. 1. The reflected wavefields are received by a plurality of seismic receivers, shown as small circles such as 32, 34 and 36 that are distributed at selected intervals along the respective lines of survey. The received wavefields are converted to electrical signals which are transmitted to recording apparatus 38 of any desired type.

The seismic array of FIG. 2 is shown as a formal set of three distinct lines of survey. In 3-D operations seismic receivers and sources are distributed at regular intervals in a grid-like pattern over an entire area. Virtual lines of survey may be established along any desired wavefield-trajectory azimuth by selecting for processing, data from receivers that happen to reside along that desired azimuth but without the need for a formal line layout.

As is well-known and as explained in the '061 reference, in the case of a vertically-fractured formation, the propagation velocity of P waves is greater traveling along a trajectory parallel to strike, the principal anisotropic axis, than along a trajectory that is perpendicular thereto. Such a formation therefore exhibits angular fracture-induced anisotropy. Given two or more lines of survey having known azimuths, the strike of the fracture pattern should be determinable by resolving the velocity vectors along each line. In practice, it is difficult to numerically resolve the velocity differences due to angular anisotropy so that method is usually not very useful.

The amplitude of a reflected wavefield depends on the contrast in acoustic impedance at the interface between two media which, in turn, is a function of the velocities and densities of the two formations.

We have found that the reflection amplitude-vector variation as a function of azimuth, for a fixed offset (separation between a source and a receiver), may be resolved about the known orientations of the lines of survey to quantify the angular anisotropic variation due to fractured formations.

Figure 3A:
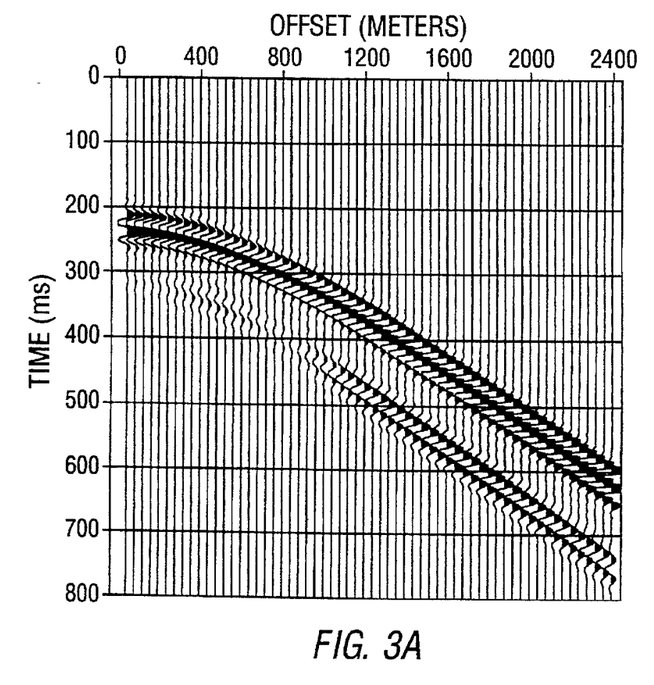
FIG. 3A illustrates the amplitude variation as a function of offset for a wave field trajectory that is parallel to the strike of a fracture pattern.
Figure 3B:
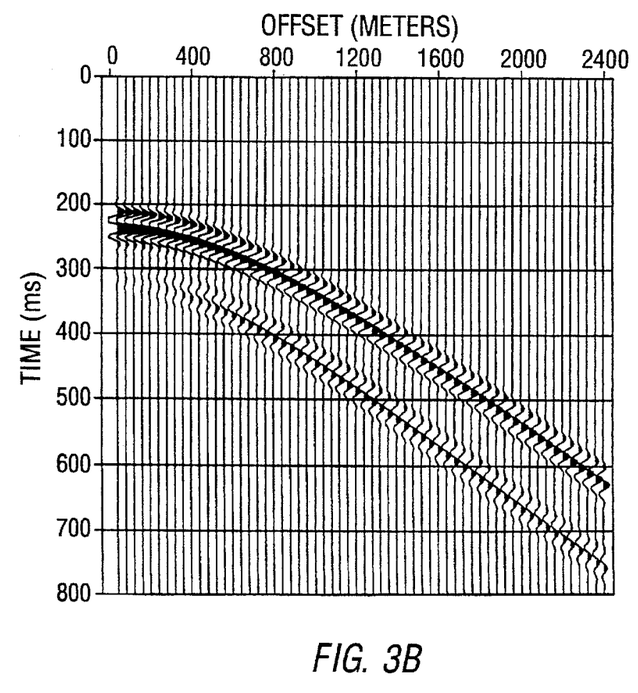
FIG. 3B illustrates the variation of amplitude as a function of offset for a wave field trajectory that is at an angle of 45° to the strike of the fracture pattern.
Figure 3C:
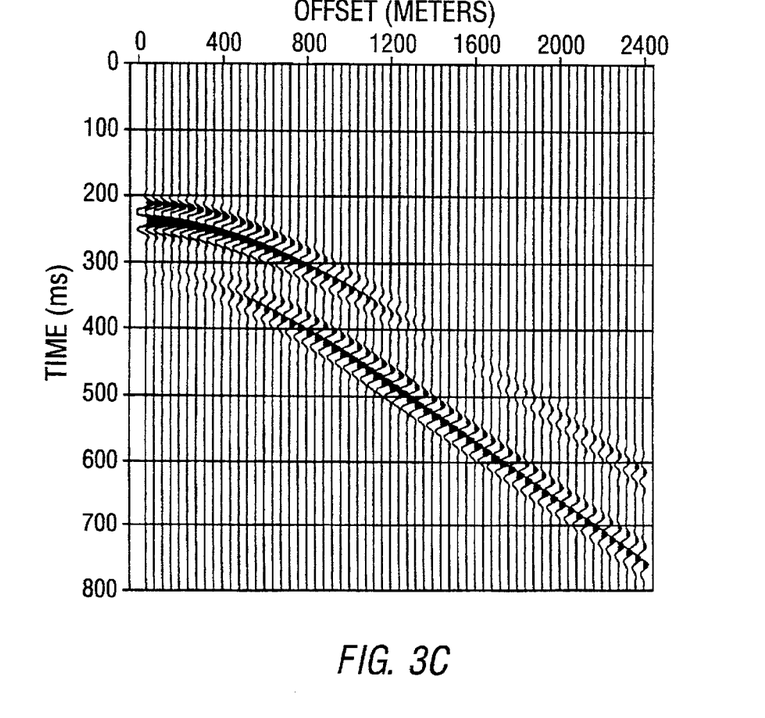
FIG. 3C illustrates the variation of amplitude as a function of offset for a wavefield trajectory that is at an angle of 90° to the strike of the fracture pattern.

FIGS. 3A, 3B and 3C are synthetic seismograms showing the change in reflection amplitude as a function of three different angular orientations of the wavefield trajectory relative to the strike of the fracture pattern, namely 0°, 45° and 90°. The first event, 37, on each seismogram is the P-wave reflection, the second event, 39, is a mode-converted P-S wave, which, insofar as this invention is concerned, is not of interest.

It is to be observed that, for offsets up to about 600 meters, the reflection amplitudes in FIGS. 3A, 3B, 3C remain substantially constant for all three azimuths. For 0° azimuth, the reflection amplitude remains constant for all offsets (the data have been normalized for spherical spreading). But beyond about 550 to 600 meters, the reflection amplitudes progressively diminish with increasing offset as the wave field trajectory rotates to become perpendicular to the fracture plane. For an explanation, let us refer back to FIGS. 1 and 2. Assume a wavefield trajectory emanating from source 30 along line 22 of FIG. 2 towards sensor 32. For a receiver near source 30, the wavefield raypath $I_1$-$R_1$ would substantially coincide with line 40 of FIG. 1, the normal to the interface of formation 12 and substantially parallel to the vertical fracture plane and therefore that portion of the wavefield would see a relatively high velocity at the point of incidence. A wide-angle ray path such as from source 30 to receiver 32 of FIG. 2 along raypath $I_2$-$R_2$ Of FIG. 1, which constitutes a wavefield-trajectory that is substantially perpendicular to the strike of the fracture pattern, becomes much flatter and sees the lower velocity that is characteristic of a wave field propagating broadside to the fracture plane.

Figure 4:
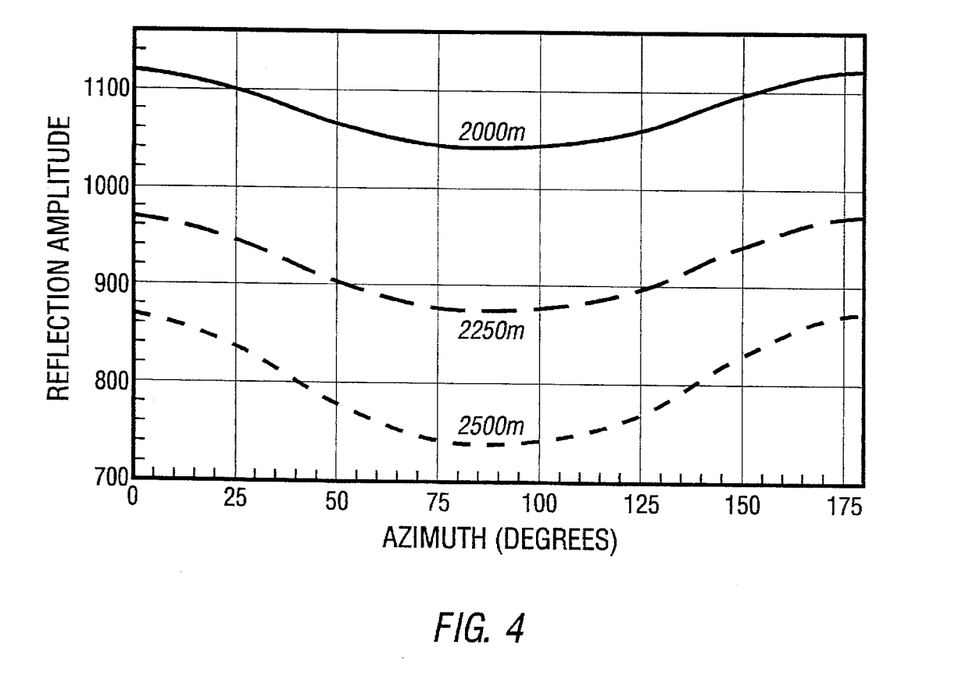
FIG. 4 shows the amplitude variation as a function of azimuth for three different source-receiver offsets.
Figure 5:
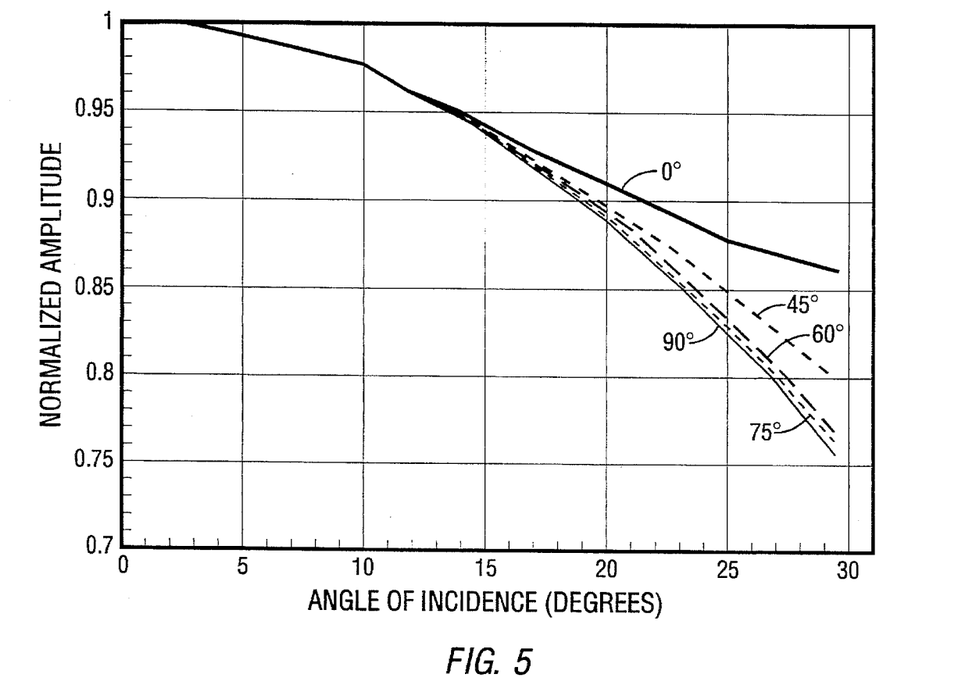
FIG. 5 is a graph of the variation of normalized P-wave amplitude as a function of angle of incidence for various relative azimuths.

Thus, we have found that there is a significant variation of the amplitude vector as a function of azimuth for wide angle reflections having an incident angle θ on the order of 20° or greater where θ is defined as the incident angle between incident ray I and the normal, 40, to the interface between formation 10 and 12. That effect is clearly shown in FIG. 4 which illustrates the change in normalized reflection amplitude as a function of the azimuth of a wavefield trajectory for three different offsets. FIG. 5 is a graph showing the variation of the normalized reflection amplitude vector as a function of angle of incidence for lines of survey having five different relative azimuths with respect to the strike of the vertical fracture plane of a target formation.

We have found that the P-wave reflection amplitude vector u, for a fixed offset, can be expressed as $$u = A + B \cos 2\phi, \quad (1)$$

where $\phi$ is the angle between the azimuth of the wavefield trajectory and the strike of a vertical fracture plane, A is an offset-dependent biasing factor and B is an offset-dependent amplitude modulation factor. A solution for $\phi$, may be formulated as follows:

Assume that for every common midpoint gather (CMP) we have three lines of survey oriented along three different azimuths, $\phi$, $\phi+\alpha$, $\phi+\beta$, $\alpha$ being the angle between a first and a second line such as 22 and 24 of FIG. 1, $\beta$ being the angle between the first and a third line such as 24 and 28. The corresponding amplitude vectors $u_1$, $u_2$, and $u_3$ can be resolved around the three azimuths to solve for $\phi$, the angle between a first line such as 24 and the principal anisotropic axis, that is, its strike as follows:

$$u_1 = A + B \cos 2\phi, \quad (2)$$

$$u_2 = A + B \cos 2(\phi+\alpha), \quad (3)$$

$$u_3 = A + B \cos 2(\phi+\beta). \quad (4)$$

Subtracting (3) from (2), $$u_1 - u_2 = 2 B \sin(2\phi+\alpha) \sin \alpha \quad (5)$$

and similarly for (2) and (4), $$u_1 - u_3 = 2 B \sin(2\phi+\beta) \sin \beta. \quad (6)$$

Combining (5) and (6) and solving for $\phi$, $$\phi = \frac{1}{2} \tan^{-1}\{[(u_1-u_2)\sin^2 \beta] \div [(u_1-u_2)\sin \beta \cos \beta - (u_1-u_3)\sin \alpha \cos \alpha]\} \pm \frac{1}{2} n\pi. \quad (7)$$

for n=1, 2, 3, . . . etc. The $u_i$ are the average amplitude vectors for selected time zones as measured from the appropriate CMP gathers for each line of survey.

In the special case where two lines such as 22 and 24 are orthogonal and a third line 28 substantially bisects the angle between the first two lines, then (7) simplifies to $$\phi = \frac{1}{2} \tan^{-1} [\{u_1+u_2-2u_3\} \div \{u_1-u_2\}] \pm \frac{1}{2} n\pi. \quad (8)$$

Suppose there is a 3-D seismic survey where there is in-line and cross-line data for every CMP gather. Determination of fracture orientation from those data is an undetermined problem. Consider the in-line direction is oriented at an arbitrary angle $\phi$ to the fracture-plane strike. From (1), the in-line amplitude response $u_1$ and the cross-line amplitude response $u_2$, at a fixed offset can be expressed as $$u_1 = A + B \cos 2\phi \quad (9)$$

and $$u_2 = A - B \cos 2\phi. \quad (10)$$

Subtracting (9) from (10)

$$u_1 - u_2 = 2B \cos 2\phi. \quad (11)$$

Figure 6:
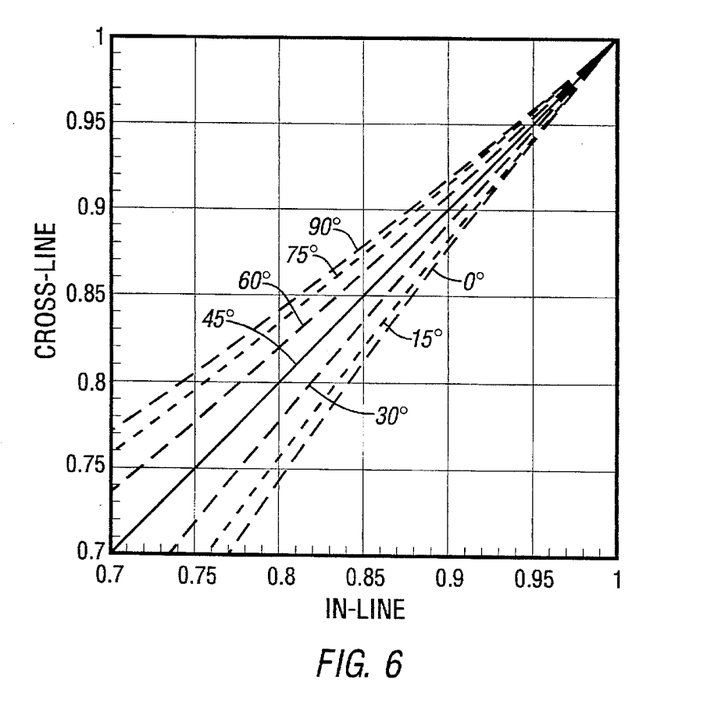
FIG. 6 is an empirical graph, for a selected area, of the in-line versus cross-line normalized amplitudes for seven line orientations with respect to the strike of a fracture pattern.

Since the offset-dependent amplitude modulation coefficient B of (11) is not known, that formulation by itself is insufficient to determine the orientation of the anisotropic axis. From experience in the area, in FIG. 6 an empirical graph may be constructed showing the normalized in-line amplitude vectors versus the normalized cross-line amplitude vectors for different values of orientation angle $\phi$ of the in-line direction with respect to the anisotropic axis such a the vertical fracture plane. The equation of the best-fitting straight line for a given curve in FIG. 6 is $$G = 1.0 + b \cos 2\phi, \quad (12)$$

G being the slope and b the intercept of the selected curve. Thus $$u_0 = -b \cos 2\phi, \quad (13)$$

whence $$\phi = \frac{1}{2} \cos^{-1}[(G-1)/b], \quad (14)$$

and from (13)

$$\phi = \cos^{-1}(-u_0/b). \quad (15)$$

In equations (12)–(14), the intercept, b, is an empirically determined coefficient dependent upon the degree of azimuthal anisotropy as induced by the fractures. In that circumstance, b is an empirically-determined coefficient that depends upon the fracture density. Therefore by calibrating the fracture densities equations (14) or (15) can be used to estimate the fracture orientation from the in-line and cross-line P-wave amplitude vectors. Those equations require use of prestack data. In the post-stack domain, $G \approx u_2/u_1$, so that $$\phi = \frac{1}{2} \cos^{-1} \{[(u_2/u_1)-1] \div b\}. \quad (16)$$

Figure 7A:
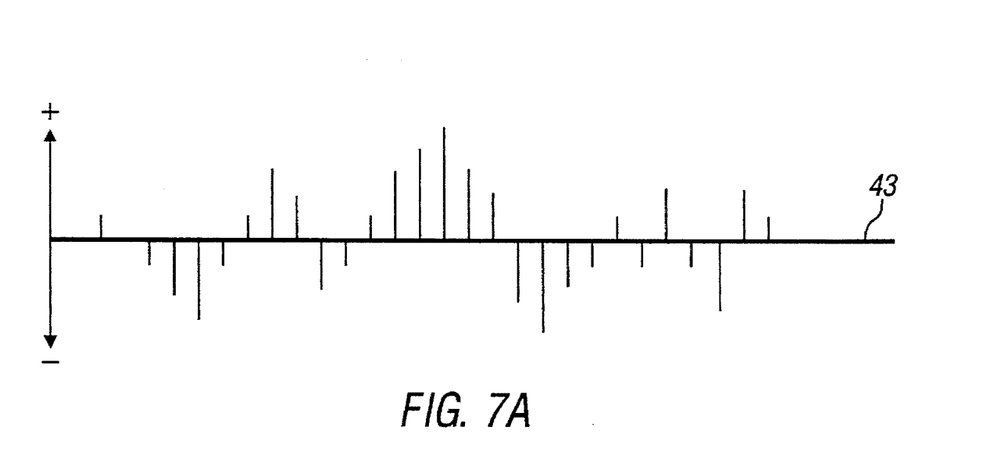
FIG. 7A is a graphical representation of sample amplitudes for a portion of a discrete time series.

As explained earlier, seismic data are customarily recorded as discrete time series of digital data samples. In operation, the discrete data samples received and recorded for each receiver are stacked to form common mid point (CMP) gathers for the in-line and cross-line components in a conventional, well-known manner. FIG. 7A shows a short portion of a time series between reflection times of 1.5 and 1.7 seconds, the amplitudes and polarities of the discrete data samples being indicated by the length of the corresponding short vertical strokes above and below the zero axis 43. The time scale is indicated at FIG. 7C.

Figure 7B:
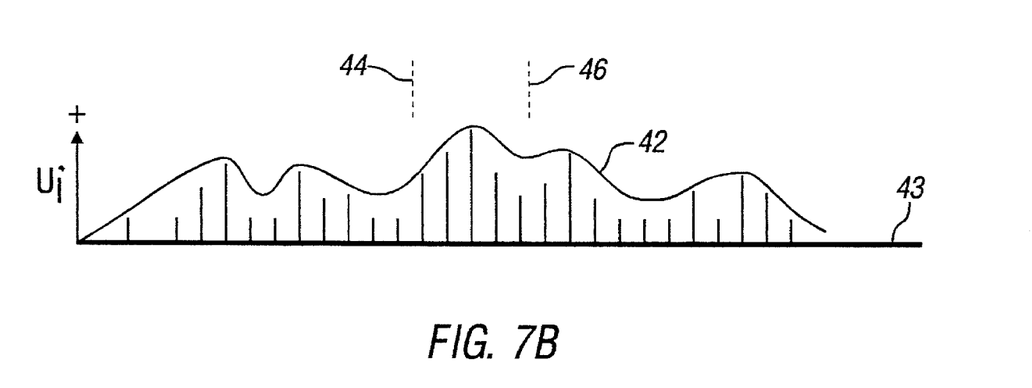
FIG. 7B is the discrete time series of FIG. 7A rectified and amplitude modulated.
Figure 7C:
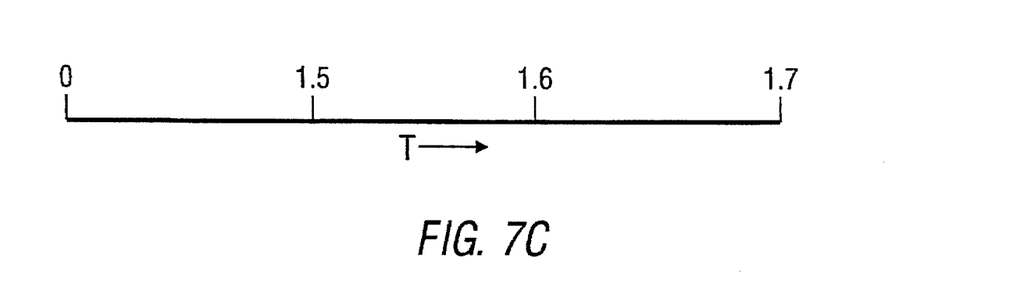
FIG. 7C is the time base for the discrete time series.

For purposes of this disclosure, the values of the discrete data samples that make up each CMP gather are rectified, such as by taking absolute values as shown in FIG. 7B. The rectified data samples are amplitude-modulated to form an average amplitude envelope 42 as shown in FIG. 7B. The amplitude vectors $u_i$ are then picked off the amplitude envelope within a time window embracing a selected reflection time-zone such as between the dashed lines 44 and 46 that corresponds to a target subsurface earth layer. The selected time zone includes reflection data originating from at or near the interface between a fractured formation of interest and a preferably isotropic layer next above. If the next overlying layer is itself anisotropic, the reflection data must be corrected for the residual anisotropic geometric spreading due to the overlying layer.

This disclosure has been prepared with a certain degree of specificity by way of example but not by way of limitation. The method has been explained herein with reference to the determination of the azimuthal alignment of vertical fracture zones. The method may of course be applied to the study of any type of lateral angular velocity variation due to any petrophysical process such as but not limited to the processes listed in the introduction to this disclosure. This invention is limited only by the appended claims.

What is claimed is:

1. A method for exploring subsurface earth layers, comprising:

emitting a seismic wavefield into the earth from a seismic source for insonifying a plurality of subsurface earth layers to generate reflected wavefields after reflection of the emitted wavefield from said subsurface earth layers;

receiving said reflected seismic wavefields by a plurality of seismic sensors distributed at a plurality of locations along a first line of survey that is characterized by a first selected angular orientation, recording the received reflected wavefields as a discrete time series of data samples and formatting said discrete time series as a first CMP data-sample gather;

receiving said reflected seismic wavefields by a plurality of seismic sensors distributed at a plurality of locations along at least a second line of survey that is characterized by a second selected angular orientation, recording the received reflected wavefields as a discrete time series of data samples and formatting said discrete time series as a second data-sample CMP gather;

within a selected time zone from each said CMP gather, determining first and second average amplitude vectors, $u_1$ and $u_2$, characteristic of the respective CMP data-sample gathers;

resolving said amplitude vectors with the selected angular orientations of said lines of survey to estimate the azimuth of a principal axis of angular anisotropy; and $$\phi \approx \tfrac{1}{2} \cos^{-1}\{([u_2/u_1]-1)/b\}$$

where $\phi$ is the angle between the angular anisotropic axis and said first angular orientation of said line of survey and b is an empirically-determined elastic modulus that is characteristic of the rock layers under investigation.

2. The method as defined by claim 1, comprising:

receiving said reflected seismic wavefields by a plurality of seismic sensors distributed at a plurality of locations along at least a third line of survey oriented at a third selected angular orientation, recording the received reflected wavefields as a discrete time series of data samples and formatting said discrete time series as a third CMP data-sample gather;

within said selected time zone, determining a third average amplitude vector, $u_3$, for said third CMP data-sample gather;

resolving said first, second and third amplitude vectors with the angular orientations of said lines of survey to define the orientation of a principal axis of angular anisotropy.

3. The method as defined by claim 1, wherein:

said first line of survey is substantially parallel to said principal angular anisotropic axis and said second line of survey is substantially orthogonal to said principal angular anisotropic axis.

4. The method as defined by claim 2, wherein:

said first line of survey is randomly oriented with respect to said principal anisotropic axis and said second line of survey is substantially orthogonal to said first line of survey.

5. The method as defined by claim 2, wherein:

said seismic sensors measure particle velocity due to compressional wavefield propagation.

6. The method as defined by claim 2, wherein:

said seismic sensors are responsive to compressional wavefields.

7. The method as defined by claims 1 or 2, comprising:

taking the absolute values of the discrete samples comprising each said CMP data-sample gather;

amplitude-modulating said absolute values to define an envelope of the peak values of the discrete samples comprising each said CMP data-sample gather; and deriving said average amplitude vectors from the respective envelopes.

8. The method as defined by claim 7, comprising:

designating a vertically-fractured target formation having a principal bedding plane from among the plurality of earth formations insonified by said wavefield;

selecting for said CMP data-sample gathers, data samples that propagate along a wide-angle reflected ray-path with respect to said target formation.

9. The method as defined by claim 8, wherein:

said wide-angle ray-paths include those ray paths that form an incident angle of at least twenty degrees with respect to the principal bedding plane of said target formation.

10. The method as defined by claim 8, comprising:

estimating the strike of vertical fracture planes in said target formation as a function of said principal axis of angular anisotropy.

11. The method as defined by claim 2, wherein:

the orientation of said third line of survey substantially bisects the angles of orientation of said first and second lines of survey.

12. A method for estimating selected characteristics of subsurface earth layers, comprising:

by means of a source of acoustic waves, causing a compressional wavefield to be reflected from a selected subsurface earth layer;

receiving a first reflected wavefield after propagation along a first wavefield-trajectory azimuth;

receiving a second reflected wavefield after propagation along a second wavefield-trajectory azimuth;

measuring the average amplitude vectors of the first and second reflected wavefields as received following said propagation along said first and second wavefield trajectory azimuths;

resolving the average amplitude vectors of said received first and second reflected wavefields with said first and second wavefield trajectory azimuths to estimate a selected anisotropic axis orientation;

receiving a third reflected wavefield after propagation along a third wavefield-trajectory azimuth;

measuring the average amplitude vector of said third reflected wavefield as received following propagation along said third wavefield-trajectory azimuth;

resolving the average amplitude vector of said third reflected wavefield vector with the average amplitude vectors of said first and second reflected wavefield and with said first, second and third wavefield-trajectory azimuths to define a principal anisotropic axis orientation.

13. The method as defined by claim 12 wherein said second wavefield-trajectory azimuth is orthogonal to said first wavefield-trajectory azimuth and said third wavefield trajectory azimuth substantially bisects the angular orientation between said first and second wave field- trajectory azimuths.

14. The method as defined by claim 12 wherein the step of resolving is accomplished by use of the formulation $$\phi = \tfrac{1}{2} \tan^{-1} \{(u_1+u_2-2u_3)/(u_i-u_2)\} \pm n\pi/2,$$

where $\phi$ is the angular difference between the first wavefield trajectory azimuth and the principal anisotropic axis orientation, and $u_1$, $u_2$, $u_3$ are the first, second and third amplitude vectors respectively.

15. The method as defined by claim 14 wherein a first, a second and a third line of survey, each line including an array of seismic receivers for receiving and recording reflected wavefields, are established in coincidence with said first, second and third wavefield-trajectory azimuths.

16. The method as defined by claim 15 wherein at least one selected characteristic of said earth layers is fracture-induced anisotropy.

17. The method as defined by claim 16, comprising:
defining a reflection time window that includes a reflected wavefield that has been reflected from a targeted subsurface earth layer;
deriving said first, second and third average wave field amplitude vectors from within the confines of said time window.

18. The method as defined by claim 15, wherein:
said plurality of seismic receivers are selectively responsive to particle velocity due to P-wavefields.

* * * * *